United States Patent [19]

Krishnaswamy et al.

[11] Patent Number: 4,800,017

[45] Date of Patent: Jan. 24, 1989

[54] FLOTATION MECHANISM

[75] Inventors: Prem Krishnaswamy, Chagrin Falls; Mark E. Hoyack, Maple Hts., both of Ohio

[73] Assignee: Dorr-Oliver Incorporated, Stamford, Conn.

[21] Appl. No.: 39,051

[22] Filed: Apr. 16, 1987

[51] Int. Cl.[4] .............................. C02F 1/24; B01F 3/04

[52] U.S. Cl. .............................. 210/219; 210/221.1; 209/169; 261/87

[58] Field of Search ................ 209/164, 169; 210/219, 210/220, 221.1; 261/87, 93

[56] References Cited

U.S. PATENT DOCUMENTS 3,882,016 5/1975 Green .............................. 210/219 X
4,075,089 2/1978 Saari et al. .................... 210/221.1 X
4,425,232 1/1984 Lawrence et al. ............... 261/87 X
4,454,077 6/1984 Litz ................................. 210/219 X
4,465,645 8/1984 Kaelin ............................. 210/219 X

*Primary Examiner*—Tom Wyse
*Attorney, Agent, or Firm*—B. J. Kearns; H. M. Snyder

[57] ABSTRACT

An improved flotation cell for recovery of minerals from ore using a three phase system flotation process provides improved metallurgical recovery through improved rotor/stator and cell design by establishing good zonal separation within the cell and minimizing froth turbulence, providing uniform aeration in the cell, and accommodating higher aeration volumes before encountering turbulence. Parameters for the rotor/stator pump assembly, a deflector vane forming part of the stator and for pump assembly/cell configuration are disclosed.

5 Claims, 5 Drawing Sheets

FLOTATION MECHANISM

BACKGROUND OF THE INVENTION

This invention relates to an improved flotation mechanism for the mining industry and in particular for the process of separating minerals from ore through flotation of the mineral and removal from the ore.

In the mining/milling industry flotation remains the primary method for concentrating and recovering minerals such as copper, nickel, iron, molybdenum, lead and zinc sulfides, coal, phosphate and other minerals utilizing copper flotation, fine coal flotation, base metal sulfide flotation and precious metal sulfide flotation.

Flotation is essentially a three phase unit process involving the intimate mixing of finely ground solids, liquid, and air to concentrate desired minerals from gangue by floating one away from the other. In carrying out the flotation process, the ore is crushed into finely ground solids and mixed with liquid to form a slurry or pulp. The slurry is then aerated using a flotation machine to achieve solid/liquid mixing and air dispersion through an external air source or by a self-aspirating flotation machine. U.S. Pat. No. 4,425,232 describes a flotation separation apparatus and method comprising a flotation machine provided with a rotor-stator pump assembly submerged in a slurry and in which rotor blades agitate the slurry thoroughly mixing the solids and liquid and introducing air to the mixture for aeration and generation of froth or foam on the surface of the flotation cell. Particles of minerals attach to carrier air bubbles which are naturally buoyant and form the froth, this being the effective mechanism for mineral recovery. Ordinarily, a wetting agent is utilized to promote wetting of the mineral particles making them hydrophobic and promoting their attachment to air bubbles forming the froth. The froth is removed hydrodynamically from the top of the slurry mass together with the entrapped mineral particles which are recovered as the froth is accumulated and dried.

As disclosed in U.S. Pat. No. 4,425,232 the flotation mechanism comprises a pump having a rotor and a stator, and is hydrodynamically designed to issue radially discharging aerated jets of pulp from the mechanism. The rotor provides a strong pumping action to suspend slurry solids and disperses air introduced into the slurry chamber providing a highly efficient method of air dispersion. In the lower part of the flotation cell the rotor draws settled solids discharging them in a fan of radial jets. The stator portion of the flotation cell eliminates a rotational component of the flow from the rotor resulting in radial discharge from the rotor as desired. The result is slurry recirculation within the cell eliminating swirling of the cell contents. Swirling of the slurry is undesirable as it tends to inhibit the formation of a stable froth layer on the slurry surface. Additionally, the stator creates a zone of high shear between the rotor periphery and stator vanes aiding in the formation of fine air bubbles. The aerated flow from the rotor is naturally buoyant and as larger quantities of air are introduced into the cell the buoyancy of the rotor effluent increases as well as the opportunity for turbulent disturbances in the upper zone of the cell. In addition, at excessively low aeration levels turbulence occurs at the corners of the cell rising to the cell surface and disturbing the froth zone.

In flotation mechanisms surface turbulence of the froth zone is a primary cause of performance loss in terms of minerals detaching from their carrier air bubbles and dropping out of the froth zone into the slurry below. Surface turbulence results from nonuniform distribution of air on the surface of the flotation cell and from excessively low and high aeration volumes. At excessively low aeration levels corner turbulence occurs at the four corners of the cell while at excessively high aeration levels center turbulence occurs at the rotor shaft, with froth disturbance in each case. Additionally, if the cell is operating without good zonal separation the inflow/outflow conditions in the lower regions of the cell manifest disturbances in the upper regions of the cell including turbulence in the froth zone.

The mining/milling industry is faced with increasing pressure to cut costs while maintaining product quality and in some cases expanding production. This invention is directed to these objectives with specific reference to flotation equipment.

SUMMARY OF THE INVENTION

The improved flotation cell according to the invention includes a rotor/stator pump assembly providing substantially improved hydrodynamic performance within the cell characterized by division of the slurry into four distinct zones including in ascending order, a turbulent zone, a quiescent zone, an enrichment zone, and a froth zone. In the lower regions of the cell in the vicinity of the pump assembly there is a zone of intense turbulence with high velocity flows necessary for suspension of solids in the slurry and contacting of pulp and air bubbles. Above the turbulent zone is a region of relative calmness identified as a quiescent zone where low circulation velocities are not adequate for full suspension allowing particles that are not attached to carrier air bubbles to fall back into the turbulent zone where air bubble/particle collision occurs. Above the quiescent zone the particles attached to carrier air bubbles separate and rise towards the top of the cell. Above the quiescent zone there exists an enrichment zone being fully undisturbed where a cleansing of the froth occurs, this zone being generally referred to as a froth enrichment zone extending approximately four to six inches below the froth/pulp interface. The froth enrichment zone is characterized by particles escaping from the froth by reason of air bubble breakage in the froth, froth drainage, and rejection of low grade material from the froth. These particles drift back toward the pulp and define the enrichment zone. Clearly defined quiescent zones and enrichment zones are especially important for slow frothing components of a flotation feed since these components or particles can easily be dislodged from carrier air bubbles by any turbulence excursions in the quiescent and enrichment zones. The improved flotation cell plays an additional role of restricting turbulence in the cell to the lower regions where suspension is important while leaving the upper portion of the cell undisturbed.

The flotation cell arrangement includes a rotor and stator pump assembly cooperating to improve cell performance particularly by reducing turbulence in the froth zone in consequence of which there is less fallout of air bubble borne minerals from the froth zone toward the pulp. Additionally, the flotation mechanism achieves good zonal separation in the hyrodynamics of the pulp and the inflow/outflow conditions from the lower turbulent zone do not effect the upper quiescent zone of the cell or the froth surface. Since the cell is operating with good zonal separations the hydrodynamics of the cell are not dependent on the inflow/outflow conditions in the lower regions of the cell. The recirculation velocities in the turbulent region of the cell are very much higher than the velocities of the typical feed/tails streams. Additionally, the suspension characteristics, i.e., the absence of sanding with the improved flotation cell are far superior than conventional designs. This is believed to occur because the improved flotation cell directs rotor effluent through the stator toward the bottom of the cell continually agitating particles which tend to repose there. With the improved flotation cell providing good zonal separation there is a substantially diminished turbulence in the froth zone.

The improved flotation cells are hydrodynamically designed to issue radially discharging downwardly oriented aerated jets dispersing within the flotation cell and providing uniform air distribution rising through the slurry. The radially directed aerated jets emerging from the rotor/stator pump assembly provide for distribution of carrier air bubbles rising through the quiescent zone collecting mineral particles carrying them to the froth zone. The aerated jets emerging from the pump stator are directed downwardly within the flotation cell at a low angle orientation resulting in uniform distribution of air bubbles throughout the quiescent zone causing highly efficient recovery of mineral particles by carrier air bubbles, eliminating air induced turbulence occurring in conventional flotation cells and substantially increasing the maximum aeration level before center turbulence occurs.

According to the invention, the flotation mechanism provides new dimensional relationships as between the rotor and the stator, as well as the specific incorporation of a deflector vane for downward deflection of rotor effuent, the positioning of the rotor with respect to the bottom of the cell as well as the angular relationship of width of stator vanes for the purposes of minimizing rotational flow of the slurry, confinment of the turbulent zone to the lower regions of the cell, uniform aeration of the cell, and minimization of sanding below the pump rotor.

The improved flotation mechanism includes the rotor/stator pump assembly fitted within a tank for receiving the slurry. The flotation mechanism provides high pumping flow at relatively low power consumption producing an excellent suspension characteristic for both fine and course particles. Generally the tank has upstanding side and end walls with a generally square cross-section and a curved bottom wall connecting the end and side walls. The pump assembly is stationed near the bottom of the cell with the stator component being supported on a stator base plate fitted to the bottom wall of the cell. The rotor is axially aligned within the stator and supported by a depending tubular shaft which rotates the rotor in either direction and supplies air through the rotor to the slurry for aerating pulp jets formed during operation. Pulp is introduced into the bottom of the cell and as the rotor moves it creates a series of aerated jets in the direction of the stator vanes which stabilize the jets removing swirling or rotary flow components therefrom. The operating rotor blades create a zone of considerable turbulence as the pulp is drawn upwardly into the rotor blades and ejected in an upwardly direction toward the stator vanes. The stator includes a deflection vane which receives the aerated jets emerging radially from the rotor and deflects the jet flow downwardly and outwardly toward the cell walls at a low orientation angle. As the turbulent aerated jets emerge from the stator vanes, the jets in part recirculate toward the bottom of the cell in a highly turbulent manner. In accordance with the invention the walls of the tank cooperate in redirecting the turbulent jets toward the bottom of the cell and the inlet zone of the pump rotor thereby effectively confining the turbulent zone to the lower region of the cell. This result is accomplished by providing compatible mechanism/tank sizes expressed as a ratio of T/D where T is tank width and D rotor diameter. An improved flotation mechanism has a T/D ratio of between 2.5 and 6.

In another aspect of the invention the rotor and stator pump assembly is configured hydrodynamically for providing superior zonal separation, uniform air distribution and improved metallurgy for flotation cells. Of particular importance is the location and configuration of the improved stator with respect to the rotor. The stator includes a top ring concentric with the rotor axis which performs the function of the deflector vanes, and is supported by a base plate located at the bottom of the cell. The stator vanes depend from the stator ring efficiently to receive aerating jets emerging from the rotor. The deflector vane defines the under surface of the stator ring for receiving the aerated jet effluent and directing it outwardly and downwardly effectively to confine the turbulent zone to the lower regions of the cell and to achieve uniform air distribution upwardly through the quiescent zone. As a result of uniform air distribution, the improved flotation cell additionally is capable of dispersing significantly higher air volumes through the cell without creating hydraulic jump or turbulence at the froth surface. The values for T/D, air volume, and power input are related in preferred flotation cells to achieve optimum metallurgical results for given mineral applications.

The rotor itself is located above the stator base plate a distance to assure turbulence in the vicinity of the base plate and to reduce sanding to insignificant quantities.

OBJECTS OF THE INVENTION

It is an object of the invention to provide a flotation mechanism with substantially increased recovery performance.

Another object of the invention is to provide a flotation cell to maximize effective air diffusion into the slurry promoting suspension of mineral particles.

Another object is to improve overall metallurgical performance by minimizing the turbulence in the froth zone of the flotation cell.

A further object of the present invention is to provide a rotor/stator configuration for flotation cell in which the effluent from the rotor is downwardly directed to confined turbulence to the lower regions of the cell and to eliminate turbulence in the froth zone.

It is an object of the invention to provide a flotation cell with superior zonal separation confining the turbulent zone to the lower regions of the cell, defining an upwardly extending quiescent zone characterized by substantially uniform air distribution therethrough, an enrichment zone above the quiescent zone for capturing and returning to the froth zone mineral particles that have dropped out of the froth zone, and a froth zone with no surface disturbance due to aeration of the cell.

It is an object of the invention to provide uniform air distribution at higher air volumes without turbulence in the froth zone.

It is an object of the invention to provide a rotor/stator pump assembly for a flotation cell which issues high velocity aerated jets of pulp and confines the jets to the lower regions of the cell while issuing ascending carrier air bubbles in substantially uniform distribution throughout the cell.

It is a further object of the invention to confine the turbulent zone to the lower regions of the cell and to minimize sanding occurring at the bottom of the cell.

It is a further object of the invention to provide a flotation cell in which the rotor/stator pump assembly is related to the dimensions of the cell in order to optimize the benefical effects of confining the turbulent zone to the lower regions of the cell including diminished sanding as well as providing for uniform aeration of the cell through the quiescent zone and substantially increasing the maximum aeration level of the cell.

Other and further objects of the invention will occur to those given the art and upon an understanding of the following description and upon employment of the invention in practice.

DESCRIPTION OF THE DRAWING

A preferred embodiment has been chosen for describing the invention and is shown the accompanying drawing in which.

Figure 1:
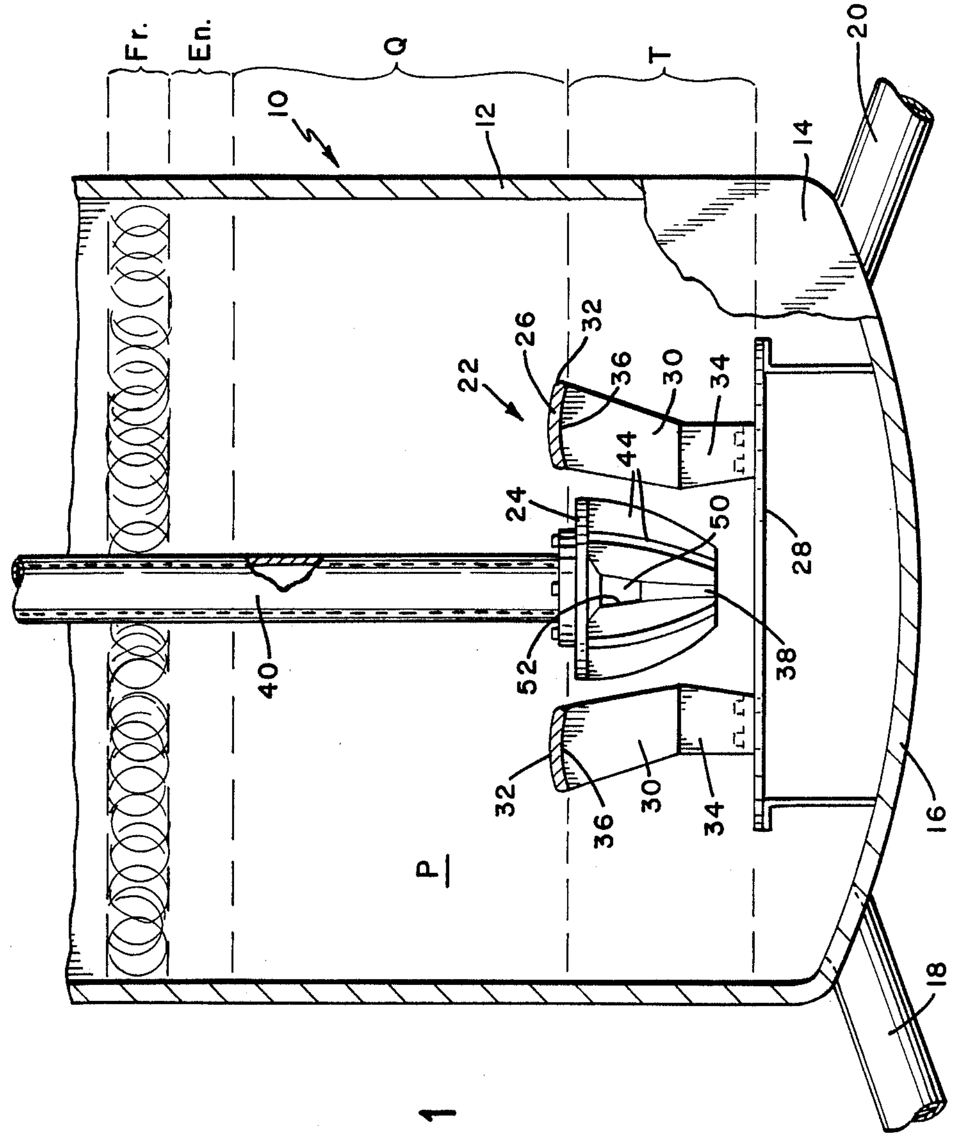
FIG. 1 is a schematic view of a flotation cell of the present invention showing the pump rotor/stator assembly located within the cell.

Referring to the drawing, particularly to FIG. 1, the improved flotation cell in preferred embodiment includes a flotation cell 10 having liquid tight upstanding side 12 and end 14 walls generally in the form of a square box with a curved bottom 16. The flotation cell is provided with an inlet 18 for receiving pulp P to be processed and an outlet 20 for discharging tailings. The pulp may generally be described as a three phase system including ore bearing minerals in crushed form intimately mixed with a suitable liquid and aerated for separating minerals from ore by flotation.

Figure 5:
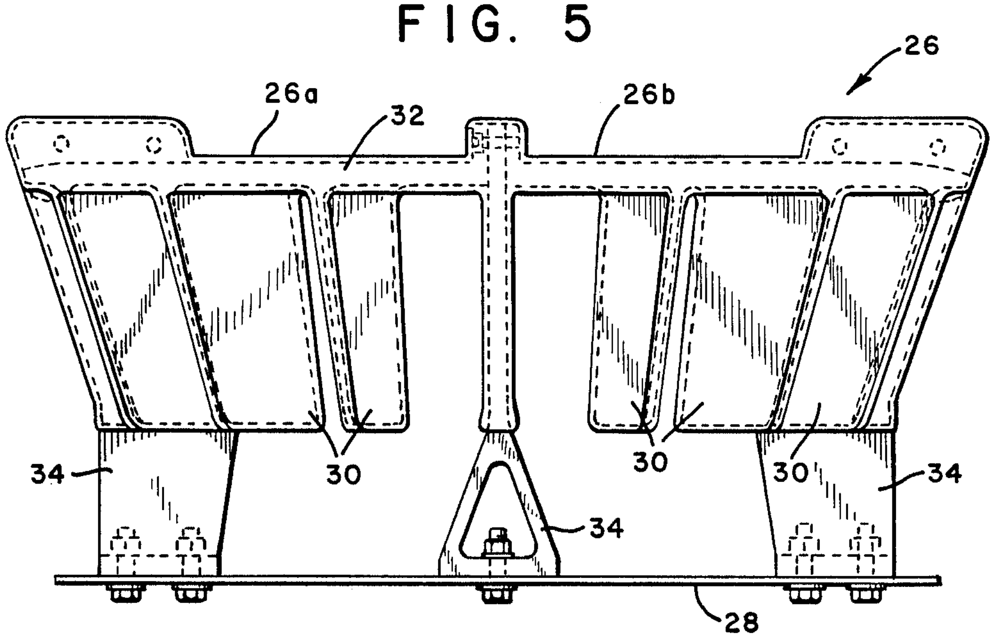
FIG. 5 is a side elevational view of a stator according to the present invention.

A pump mechanism 22 including rotor 24 and stator 26 are axially aligned and located in the lower region 28 of the flotation cell. The stator is supported in fixed position on a base plate 28 fitted to the bottom of the cell. As best shown in FIG. 5 the stator includes four segments **26*a*–*d* fitted together by appropriate means and having a plurality of stator blades 30 depending from a top ring 32. Spaced standards 34 support and attach the stator to the base plate. The top ring of the stator assembly has an under side hydrofoil surface defining a deflector vane 36** as described more particularly below.

The pump rotor (FIG. 3) comprises a main body 38 depending from a hollow drive shaft 40 which introduces pressurized air, typically at 2 psig, into the cell for aerating the pulp during operation. The primary function of the rotor is to provide a strong pump action for suspending solids and dispersing air into the cell at relatively low power consumption. The rotor includes a horizontal top plate 42 and a plurality of vertically oriented tapered rotor blades 44 projecting outwardly from a rotor hub defined by an inner wall or cusp 46. Adjacent rotor blades with intermediate cusp define a series of pump chambers 48 for receiving and discharging pulp at high velocity during cell operation. Each pump chamber includes a suction zone drawing pulp into the pump, an ejection zone, and an intermediate eddy zone which experiences high speed pulsating rotational flow around a tangential axis. The interior 50 of pump hub is hollow and has a series of ports 52 for issuing pressurized air into each pump chamber for aerating the pulp as it is discharged from the pump in the form of upwardly and tangentially direction high velocity jets.

Figure 4:
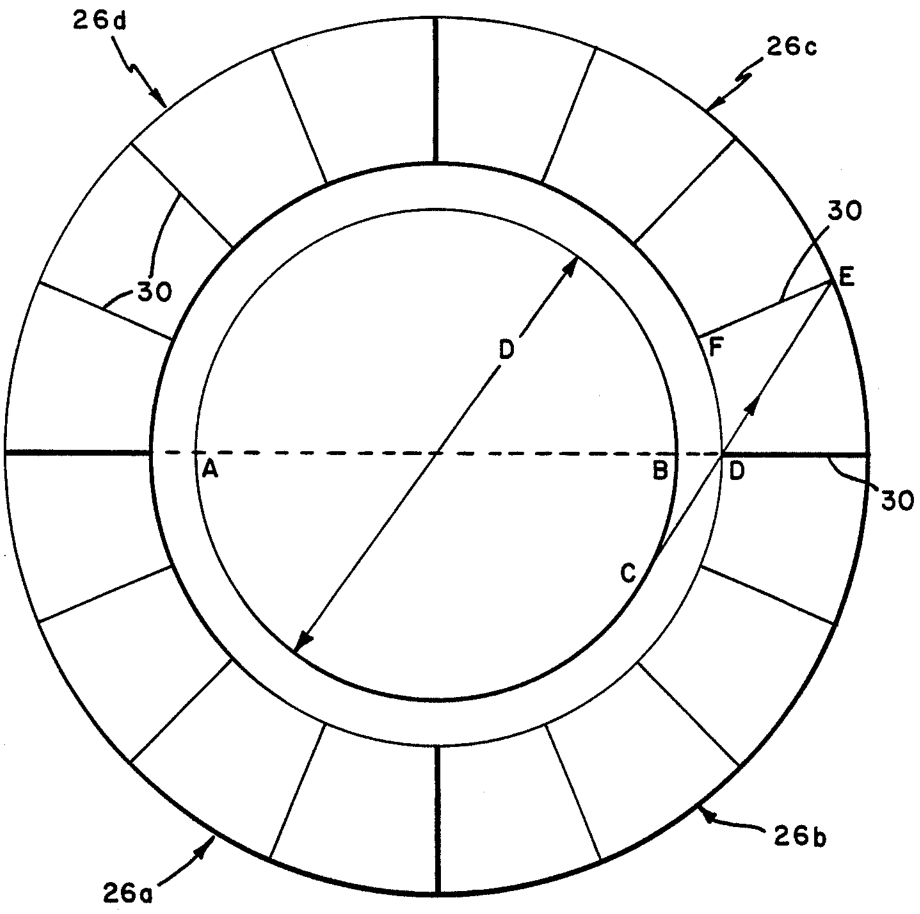
FIG. 4 is a schematic view indicating the geometric considerations for stator design.

The jets ejected tangentially from the rotor naturally tend to swirl through the flotation cell inhibiting the formation of a stable froth layer on the top of the pulp surface. The stator blades 30 intercept the jets redirecting them to flow radially of the pump assembly eliminating swirling. There is a circular zone of high shear created between rotor and stator blades aiding the formation of fine air bubbles in the pulp jets. Each stator blade extends from the top ring 32 to the top of the suction zone to ensure redirection and elimination of rotational jet flow without interfering with rotor intake at the suction zone. The number and width of stator blades is geometrically determined as shown in FIG. 4 so that the tangential effluent from each pump chamber (blade tip) is fully received and redirected by a stator blade.

Figure 2:
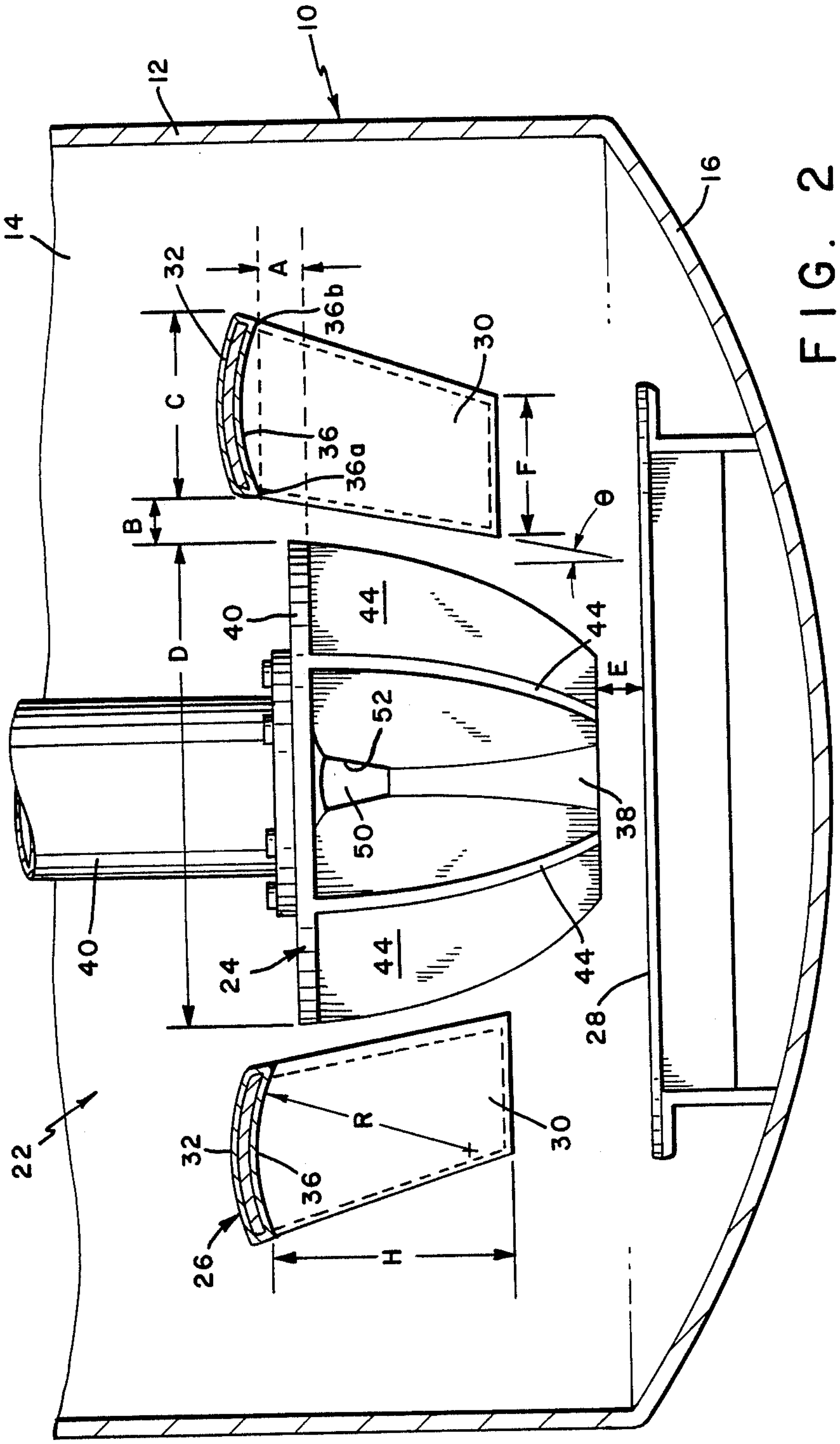
FIG. 2 is a schematic view of the improved flotation mechanism according to the invention indicating the dimensional relationships of rotor/stator and the flotation tank.
Figure 6:
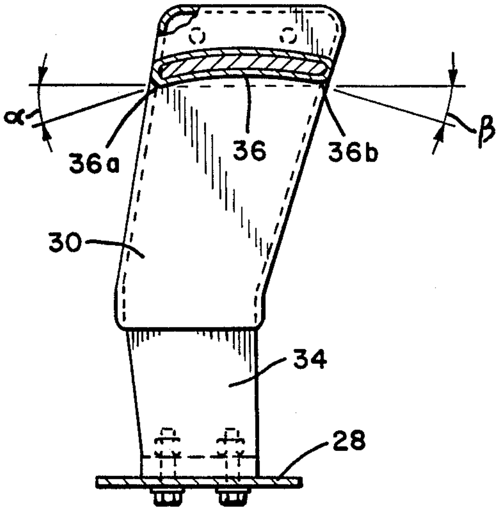
FIG. 6 is a elevational view partly in section showing a stator blade of the invention.

In an important aspect of the invention hydrofoil surface of the stator top ring defining a deflector vane 36 deflects the emerging jets downwardly and outwardly toward the walls of the receiving tank 10. The deflector vane, as best shown in FIGS. 2 and 6, has a hydrofoil surface 36 of constant radius with entry **36*a* and exit 36*b*** points generally horizontally aligned. The vane surface is downwardly directed at both entry and exit points defining entry angle $\alpha$ and exit angle $\beta$ which are substantially equal in the preferred embodiment. The entry angle of the vane is selected to receive the upwardly directed aerated jets emerging from the rotor, and after being deflected by the hydrofoil surface, the redirected jets emerge from the stator in a downward direction at a low orientation angle determined by exit angle $\beta$. Preferably, entry and exit angles $\alpha$, $\beta$ of the deflector vane are approximately 15°.

Figure 3:
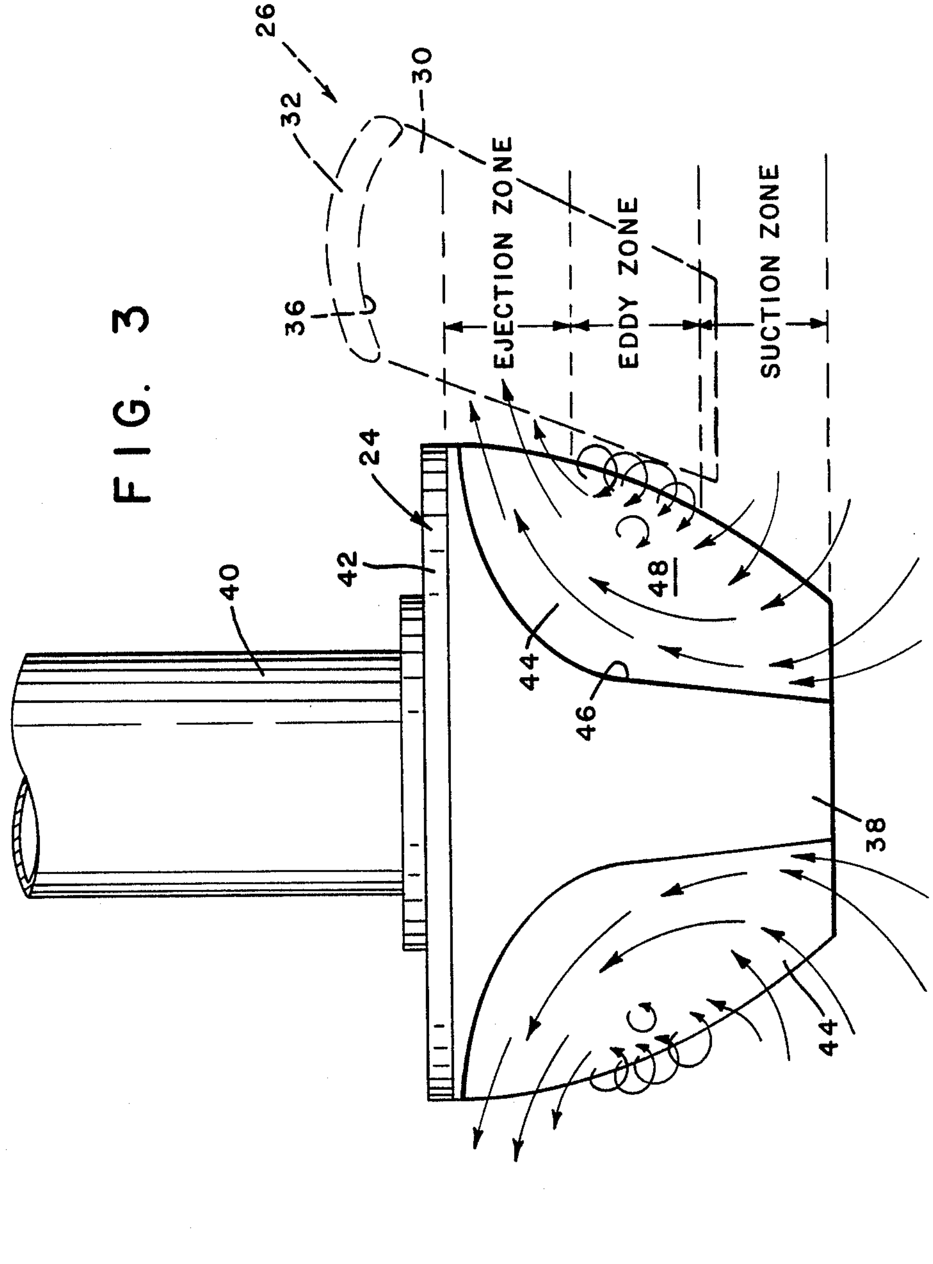
FIG. 3 is an operational view of the rotor indicating the turbulent zone and its subzones including suction zone, eddy zone and ejection zone.

As best shown in FIGS. 1 and 3, the flotation cell generates a turbulent zone T of pulp substantially confined to the lower region of the cell resulting in the significant advantages of the invention. Confinement of the turbulent zone results from pumping action in cooperation with the receiving tank walls in the lower region of the cell. As the downwardly directed aerated pulp jets emerge in turbulent flow radially from the stator blades and deflector vane, the jets are guided by the tank side walls toward the under side or suction zone of the pump. By this confinement sanding, i.e., accumulation of ore and minerals beneath the rotor and above the stator base plate, is minimized. This area is kept substantially clear as sand settling is kept in active circulation participating in the mineral separation process performed in the flotation cell.

The confinement of turbulence to the lower region of the cell and the resulting advantages are promoted and achieved through hydrodynamic relationship of the pump rotor and stator components as well as hydrodynamic relationship of the pump assembly to the tank itself.

In accomplishing good zonal definition of the turbulent zone the deflector vane forming part of the stator has an exit angle resulting in downward deflection of emerging jets from the stator. Additionally, dimensional relationships for rotor and stator are selected as a function of rotor diameter D for specific applications of the improved flotation cell.

The entry point 36*a* of the deflector vane is located a vertical distance of approximately 0.1 D above the departure point of pulp jets from the upper edge of the rotor blades. Additionally, the stator is further located horizontally from the jet departure point a distance of approximately 0.1 D precisely defining the jet capture point or point of entry 36a of the emerging aerated jet onto the deflector vane. As indicated at FIG. 2, the width of the vane of the upper C and lower F surfaces are determined by the tangential relationship of emerging jets as shown in FIG. 4. An emerging jet moving tangentially from the rotor along vector CDE will pass the inner edge D of preceding vane 30 and be captured by the extreme outer surface E of the next succeeding vane. The point of intersection E defines the outer margin of the vane at both the upper and lower edges of the stator vane. In a preferred 16 vane stator, the vane width C at the upper edge is approximately 0.37 D and at the lower edge F it is 0.291 D. This arrangement of the stator effectively eliminates rotational components of flow of aerated jets.

The bottom surface of the rotor is spaced approximately 0.1 to 0.15 D above the base plate; this dimension being selected in order to achieve minimal sanding of the pulp in this region of the cell. The depth of the stator blade is approximately 0.5 D locating the lower edge of the blade in the suction zone. The radius of curvature of the deflector vane is approximately 0.714 D with the center of curvature being located trigonometrically on the blade surface.

The angle of repose at the inner edge of each stator vane is approximately 11° chosen to keep approximately the same distance between the edges of rotor blades and the edge of the stator vane for establishment of a high shear zone for forming fine air bubbles between rotor and stator.

The good zonal separation achieved utilizing the rotor/stator pump of the present invention results in addition from properly selecting the location of the cell side walls with respect to the rotor centerline. As described above, the receptacle container has a generally square cross-section and the width of the tank between opposite side walls is selected to achieve cooperative action with the downwardly directed aerated jets emerging from the stator deflector vane in order to confine the turbulent zone to the lower reaches of the cell. We have determined that the width T of the tank expressed as a ratio of the diameter D of the rotor, T/D, should fall in the range of approximately 2.5 to approximately 6. For specific applications elaborated below an optimum T/D ratio is approximately 4.5 to 4.9. In an illustrative example at commercial scale tank width may be approximately 100 inches with rotor diameter approximately 20 inches. Within this ratio the downward deflection is confined to the lower region of the cell permitting efficient recirculation of part of the emerging jets and cooperating with efficient and uniform air distribution of the ascending aerated pulp jet moving throught he quiescent zone Q.

The turbulent effluent from the stator being downwardly directed at a relative low orientation angle determined by deflector vane exit angle $\beta$ gives rise to substantially uniform aeration of the flotation cell in a quiescent middle region or zone Q extending upwardly from the turbulent zone. The aerated effluent includes a mass of carrier air bubbles some with attached mineral particles ascending and dispersing uniformly through the quiescent zone. Other ascending air bubbles engage mineral particles in the quiescent zone carrying them to the froth zone FR. The uniform air distribution and the lack of turbulence contribute significantly to cell performance in mineral recovery. The enrichment zone EN is located just below the froth receiving such mineral particles as become detached from the froth returning to the enrichment zone for reattachment to ascending air particles thereby substantially improving metallurgical recovery.

The achievement of uniform air distribution with the improved flotation mechanism allows for greater aeration volume and improved metallurgical performance. At low aeration levels strong upflow conditions occur at the four corners of the cell known as corner turbulence. As aeration volume is increased, corner turbulence subsides and the cell operates with a quiet stable froth column. Aeration volume can be increased through a considerable range to the limit of air dispersion capacity of the cell beyond which vigorous boiling (center turbulence) occurs around the rotor shaft. With the improved rotor stator pump assembly, especially the hydrofoil deflector vane 36, a significantly increased maximum aeration level is realized before the onset of center turbulence occurs disrupting the froth zone. In one application, an improved flotation cell operating at an optimal rotor speed of 800 RPM has a maximum aeration level of 55 standard air cubic feet per hour compared to 30 SCFH at 700 RPM for a comparable conventional flotation cell. The improved aeration levels occur with cell T/D ratios between approximately 2.8 and 6. The preferred T/D operating range is 4.5 to 5 with an optimum at 4.9 at which the highest aeration levels are achieved.

In comparative bench testing between improved and conventional flotation cells, improved metallurgical performance resulting from improved cell hydrodynamics was verified. In this testing, fresh porphyry copper ore feed with pulp density of 27% solids was processed and observed for recovery of copper and molybdenum at various air flow rates. After operation of the comparative cells for approximately fifteen minutes with an aeration of 70 SCFH the improved cell demonstrated a recovery rate for copper of approximately 80% with the standard cell recovering approximately 74%. The recovery rates of molydenum under the same operating conditions were approximately 46% for the new cell and 39% for the standard cell.

We claim:

1. An improved flotation mechanism suitable for flotation separation of materials from ore comprising an upstanding liquid tight receiving tank for receiving and processing a three phase slurry including intimately mixed finely ground solid liquid and air, a pump located within the cell defined by the receiving tank and located in the lower region of the cell, the pump including rotor and stator members for creating a turbulent flow of the slurry for intimately mixed ground solids and for aerating the mixture, and means for directing the turbulent flow within the cell, said directing means comprising deflector vanes joining said stator members and having a predominantly horizontal orientation with a downwardly directed exit angle for receiving the flow of slurry from the rotor and redirecting that flow to a generally outward and downward direction so that turbulent flow within the cell is confined to the lower region of the cell while formation of an upwardly extending uniformly aerated quiescent zone above the turbulent zone is promoted and an enrichment zone and a froth zone for efficient flotation of mineral particles by attachment to carrier air bubbles for recovery at the froth zone are formed.

2. An improved flotation mechanism as defined in claim 1 in which the deflector vane has a hydrofoil surface of constant radius, and substantially equal angles of entry and exit.

3. An improved flotation mechanism as defined in claim 2 in which the deflector vane points of exit and entry are horizontally aligned and the entry and exit angles are downwardly directed at approximately 1520 from the horizontal.

4. An improved flotation mechanism as defined in claim 3 in which the ratio of tank width to rotor diameter, T/D lies in the range of approximately 2.5 to 6.

5. An improved flotation mechanism suitable for flotation separation of materials from ore comprising an upstanding liquid tight receiving tank for receiving and processing a three phase slurry including intimately mixed finely ground solid liquid and air, a pump located within the cell defined by the receiving tank and located in the lower region of the cell, the pump including rotor and stator members for creating a turbulent flow of the slurry for intimately mixed ground solids and for aerating the mixture, and means for directing the turbulent flow within the cell, said directing means comprising deflector vanes joining said stator members and having in cross-section, a hydrofoil lower surface with the deflector vane points of entry and exit horizontally aligned and the entry and exit angles downwardly directed at approximately 15° from the horizontal thereby being capable of receiving the flow of slurry from the rotor and redirecting that flow to a generally outwardly and downward direction so that turbulent flow within the cell is confined to the lower region of the cell while formation of an upwardly extending uniformly aerated quiescent zone above the turbulent zone is promoted and an enrichment zone and a froth zone for efficient flotation of mineral particles by attachment to carrier air bubbles for recovery at the froth zone are formed.

* * * * *

UNITED STATES PATENT AND TRADEMARK OFFICE

CERTIFICATE OF CORRECTION

PATENT NO. : 4,800,017

DATED : January 24, 1989

INVENTOR(S) : Prem Krishnaswamy et al

It is certified that error appears in the above-identified patent and that said Letters Patent is hereby corrected as shown below:

IN CLAIM 3, LINE 4, CHANGE "1520" TO READ --15°--.

Signed and Sealed this

Sixth Day of June, 1989

Attest:

DONALD J. QUIGG

*Attesting Officer* *Commissioner of Patents and Trademarks*